Dec. 27, 1966 S. W. ALDERSON 3,294,083
DOSIMETRY SYSTEM FOR PENETRATING RADIATION
Filed Aug. 26, 1963 2 Sheets-Sheet 1
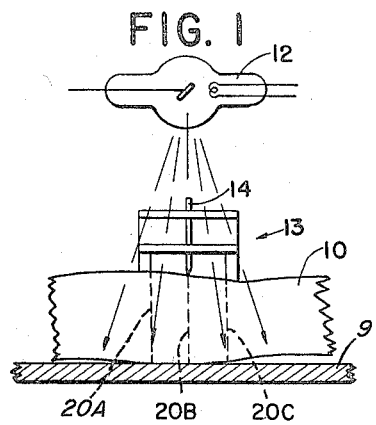
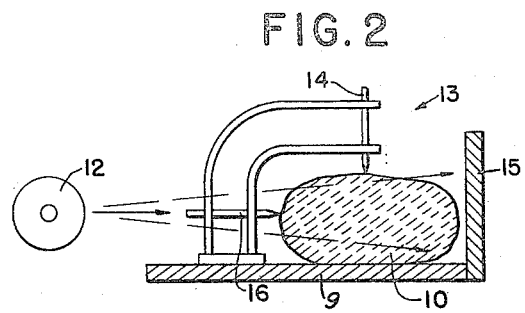
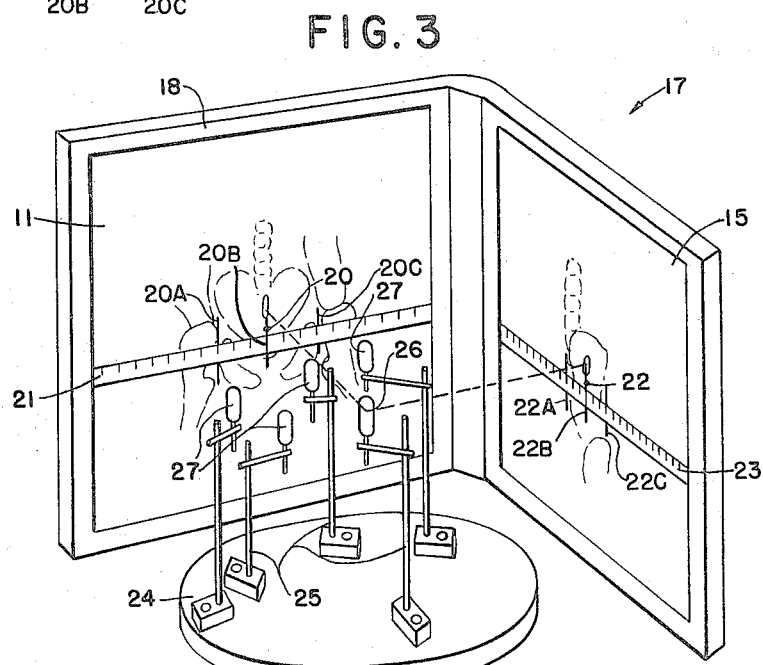
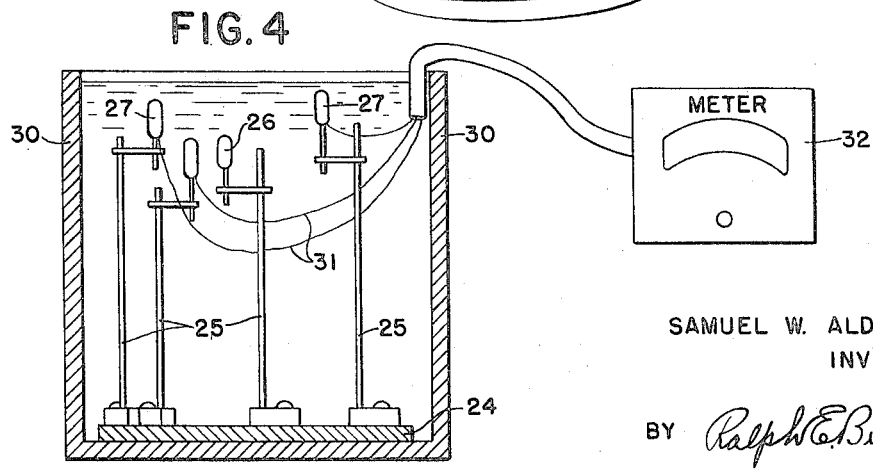
SAMUEL W. ALDERSON
INVENTOR
BY Ralph E. Bitner
ATTORNEY Dec. 27, 1966 S. W. ALDERSON 3,294,083
DOSIMETRY SYSTEM FOR PENETRATING RADIATION
Filed Aug. 26, 1963 2 Sheets-Sheet 2

SAMUEL W. ALDERSON
INVENTOR

BY Ralph E. Bitner
ATTORNEY

United States Patent Office 3,294,083
Patented Dec. 27, 1966

3,294,083
DOSIMETRY SYSTEM FOR PENETRATING
RADIATION
Samuel W. Alderson, New York, N.Y., assignor to Alderson Research Laboratories, Inc., Long Island City, N.Y., a corporation of New York
Filed Aug. 26, 1963, Ser. No. 304,394
8 Claims. (Cl. 128—2)

This invention relates to a dosimetry system for controlling and monitoring the application of penetrating radiation to the human body and includes a measuring system which can be used to determine the amount of radiation received by various body organs even though radiation sensitive devices are not positioned at the organs during the actual radiation operation.

This invention is especially designed for the treatment of cancer by the use of penetrating radiation sources placed inside the body. In the treatment of cervical cancer, for example, radium is inserted into the patient's vagina and positioned against the cervix where it is packed into place and allowed to remain for a suitable period such as three or four days. During this time, the radiation emitted from the source is absorbed by the surrounding tissues in the region, including both cancerous and normal tissues. If a large amount of radiation is received by the cancerous tissue, there is a reasonable prospect for its destruction and for the cure of the patient. However, adjoining body structures are highly sensitive to radiation, particularly the walls of the bladder and rectum. If the absorbed dose to these body parts is an appreciable fraction of that absorbed by the cancer there is a likelihood that these tissues will be destroyed, thereby resulting in a massive and usually fatal infection. Frequently, the radiologist in his efforts to avoid damage to these tissues will under-dose the cancer, failing to destroy it. For the above reasons, the treatment of cervical cancer involves a balance between the dose delivered to the cancer and the dose delivered to other sensitive body organs.

A number of prior schemes have been suggested for determining the correct dose in such a situation. A number of tabulations have become available to show the strength of the radiation field in the space surrounding the source of radiation. However, these tables require a precise knowledge of the locations of the radiation sources with respect to the surrounding body organs. Without such geometric information the data contained in these tables are of little use.

The invention described herein not only determines accurately the position of all the sensitive body organs in relation to the source of radiation but also determines the exact amount of radiation received by each organ even though a measuring means is not inserted into the body during the radiation operation. A set of two radiographs are employed to determine the position of the source and sensitive organs in the body. A duplicate radiation source is then positioned on a support and various measuring devices are positioned on the support in the position normally occupied by the selected organs. The support with its components is then immersed in a container filled with water and measurements are made using the radiation sensitive devices to determine just how much radiation will be received by the selected organs.

In the specification and claims the term "penetrating radiation" is used to include the radiations from any sources used in the treatment of cancer. Also, the term "radiation sensitive devices" is used to mean any type of component which can be employed to determine the strength of the radiation used. These devices include Geiger-Mueller counters, ion chambers, and scintillation crystals.

One of the objects of this invention is to provide an improved dosimetry system which avoids one or more of the disadvantages and limitations of prior art systems.

Another object of the invention is to determine the actual radiation dose received by the cancerous tissues.

Another object of the invention is to limit the dose so that normal tissues will not be harmed.

Another object of the invention is to determine the dosage of any part of the body whether accessible or not by the usual measuring devices.

Another object of the invention is to determine accurately the positions of the lateral and vertical X-ray sources which are used to produce usable images for the system.

The invention comprises a dosimetry system for controlling the application of penetrating radiation to the human body. An alignment means is first employed for positioning X-ray sources and plates to produce two X-ray pictures taken of the body at right angles to each other and with intersecting median rays. The X-ray pictures are mounted in a right-angled frame for determining the relative positions of selected organs and radiation sources within the body. A support is mounted adjacent to the frame and sources of penetrating radiation are clamped to the support in the place in which the sources are positioned in the body. This positioning operation is relative to the body spaces as defined by the two X-ray photographs. A plurality of radiation sensitive devices are also clamped to the support in the relative spacing defined by the selected body organs. Radio sensitive devices are also clamped to the support in similar positions that radio sensitive devices are positioned within the body. This serves as an accuracy check since similar measurements on the patients and in the reconstructed measuring device. The actual measuring of the radiation is made while the support and its components are immersed in water.

For a better understanding of the present invention, together with other and further objects thereof, reference is made to the following description taken in connection with the accompanying drawings.

FIG. 1 is a side view of a portion of a human body positioned over a photographic plate, showing an X-ray source and an alignment means.

FIG. 2 is a partial cross sectional view of a human body with an X-ray source and photographic plate set for taking a picture at right angles to the first.

FIG. 3 is an isometric view of a photograph right-angled frame for mounting two X-ray pictures. This view also shows a supporting base for holding a source of radiation and a plurality of measuring devices.

FIG. 4 is a cross sectional view of a container showing the support and its components and a measuring system connected to the measuring devices.

Figure 5:
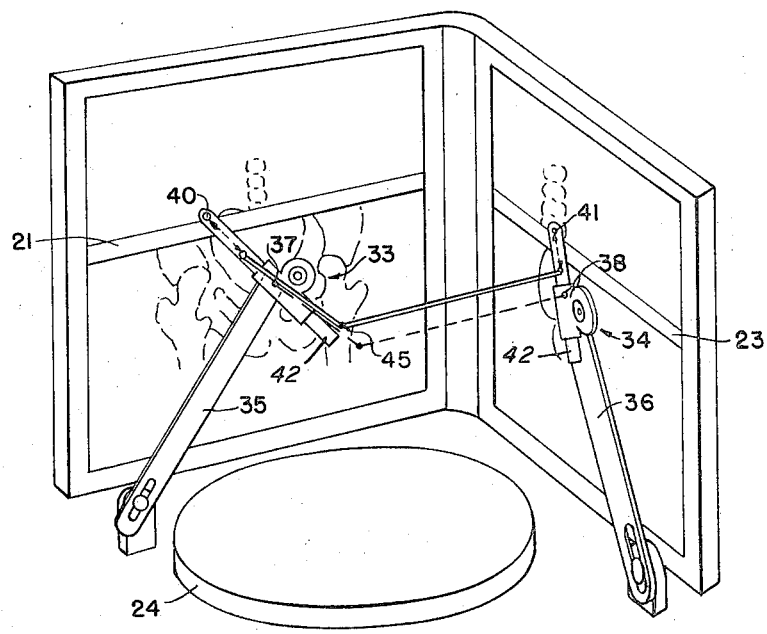
FIG. 5 is a perspective view of the right-angled frame plus two indicating arms for designating the true position of any desired organ or radiographic source.

Referring now to FIGS. 1, 2 and 3, a portion of a human body 10 is shown on a table 9 which may include an unexposed radiography emulsion. A radiation source 12 is positioned above the body for supplying the penetrating radiation which exposes the plate. In order to be sure that the central or median ray from the radiographic source is properly defined, an alignment device 13 is placed over the body and a vertical pin 14 is positioned in line with the upper source of X-rays. A set of three opaque lines 20A, B, and C is inscribed on a portion of the alignment device so that these lines will appear on the finished X-ray photograph 11.

A second X-ray picture is next taken as indicated in FIG. 2 where the radiographic source 12 is positioned at the side of the body and a radiographic emulsion 15 is positioned on the other side of the body and in vertical alignment. A second alignment pin 16 is horizontally mounted in the alignment frame 13 and the radiography source is positioned in line with the length of this pin so that the median rays will intersect. Three additional opaque lines are inscribed in the vertical portion of device 13 nearest to the body. These lines appear as reference lines 22A, B, and C and in photograph 15 (see FIG. 3). Alignment pins 14 and 16 are removed from the device before the pictures are taken. The two pins 14 and 16 are aligned so as to intersect in the body space and this intersection point is generally selected by the operator to lie in a position which is close to either the source of radiation or the cancerous tissue radiated by the source.

After the two films have been developed, they are mounted in a right-angled frame 17 which may include lighting means at the rear of each photograph for illuminating the image. Frame 17 includes a first mounting means 18 in which film 11 is secured with its central index line 20B aligned behind a scale 21. In a similar fashion photograph 15 is mounted in the other portion of frame 17 with its central index line 22B mounted adjoining the second scale 23. Scales 21 and 23 are for the purpose of compensating for the variable size of the images and the variable distances of the selected organs from the central index points. The variable sizes are produced by the cone of X-rays which proceed from a central anode position to an area which covers the entire plate. It is obvious from an examination of FIGS. 1 and 2 that objects near the surface of body 10 will be projected onto areas which are larger than the areas of similar sized objects in the body lying adjacent to the surface of the photographic plate. The same sort of distortion is present in the laterally exposed pictures as indicated in FIG. 2. If there is any doubt about the disposition of the photographs and the index points 20 and 22, an alignment means can be quickly set up to assure the operator that the median ray which produced spot 20 intersected the beam which produced spot 22.

With the two photographs mounted at right angles to each other in frame 17, the operator next proceeds to position the source of penetrating radiation and a number of radiation sensitive devices which lie in the space which is normally occupied by radiation sensitive human organs. A base support 24 is mounted adjacent to the two photographs as shown in FIG. 3 and a plurality of clamps 25 are placed on the support for holding the measuring devices and the source of radiation. In order to align the sources 26 and the radiation sensitive devices 27, two indicating devices 33 and 34 (FIG. 5) are mounted on rods 35 and 36 with reference points 37 and 38 positioned in line with the median ray of each photograph. Next, the operator moves a sliding measuring rod 42 so that the end pointers 40 and 41 are over the organ (or source) to be positioned. The two scales 21 and 23 are now moved next to the pointers and the scale divisions on the scales noted. These divisions denote the distortion caused by the divergent cone of X-rays used to take the picture. The division spacings are computed in advance and vary in accordance with the geometry of the X-ray cone, depending upon the distances of the X-ray source and the photographic plate from the body.

The operator next moves each slider bar 42 an amount depending upon both the scale divisions and the new positions to denote the actual positions of the organ (or source) in space. Projecting these positions by means of telescoping rods 40 to an intersection point 45 shows where the organ is positioned in space. This point is shown in FIG. 5. The operator may now clamp a source or a radiation sensitive device at this point and proceed to the next placement.

All the radiation sensitive devices 27 are clamped to support 24. These devices are positioned at all points where dose information is needed, including the tumor, bladder, rectum, and other sensitive locations. Usually, similar devices are positioned in a body cavity of the patient or on the skin. These are duplicated in the reconstructed array so that an accuracy check can be made. While FIG. 3 shows only a few of such radiation sensitive devices, it is understood that many more can be positioned in and around source 26. As many sources 26 may be positioned in the array as are used within the patient's body.

After all the sources 26 and measuring devices 27 have been permanently secured to support 24, the support is lowered into a container 30 which is preferably made of thick lead to reduce the radiation hazard to the operating personnel. The container 30 is now filled with water since water is a convenient equivalent of the body tissues insofar as the absorption of X-rays, beta, or gamma radiation is concerned. In this condition the source 26 sends out its penetrating radiation and the radiation sensitive devices 27 receive the same proportion of radiation as they would if all the devices were inserted into a human body.

The measurement of the radiation received by each of the devices 27 can be made in several ways. If the devices are Geiger-Mueller counters, each will be connected to conductors 31 which can be switched to an amplifying and indicating device 32 which tells immediately how much radiation is being received by each unit. If the devices 27 are scintillation counters or if they are ion chambers they may also be connected by conductors to a measuring means which will determine immediately the rate of radiation. Another type of measurement means comprises an ion chamber which includes a chargeable capacitor which is charged to a known voltage prior to the immersion into container 30. This type of measuring device is well known in the art and its construction need not be described in detail. The application of penetrating radiation slowly discharges the capacitor. The amount of discharge is proportional to the intensity of radiation. After the radiation operation is completed, the ion chambers are removed from their supports and placed into a specially designed meter which measures the voltage remaining on the capacitor plates. This type of measuring device has been used in a number of measuring operations because a single meter may be employed for the servicing and measurement of many hundreds of ion chambers.

Figure 6:
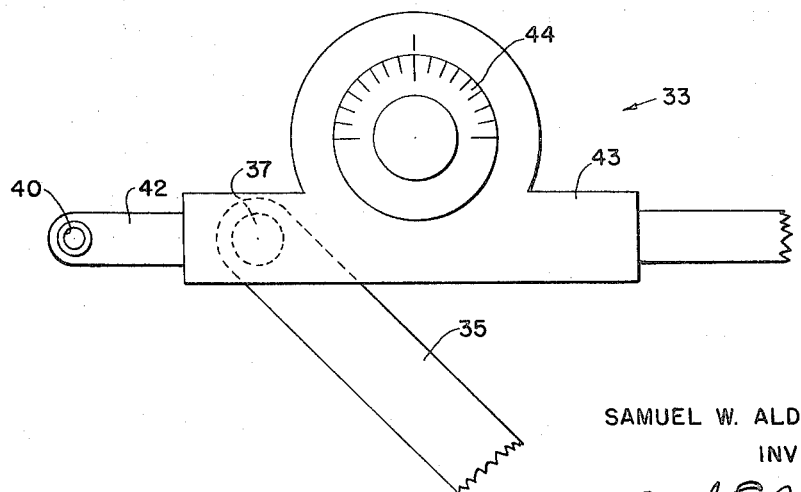
FIG. 6 is a detailed side view of an adjustable indicator used to indicate the position of an organ.

FIG. 6 shows one form of an indicating device 33 which can be used to position desired organs in the reconstructed array. It comprises a sliding rod 42 mounted within a channeled holder 43. The holder is secured to rod 35 by a swivel point 37 the axis of which is mounted in line with the median ray. One end of rod 42 contains an indicator point 40 which is moved to coincide with the X-ray image. Rod 42 is moved in holder 43 by means of a rack and pinion secured to an indicator knob 44. The indicator 44 shows the separation of the axis position 37 from the axis of rod 40.

From the above description it will be obvious that the reconstructed radiation model can be employed to make accurate measurements of penetrating radiation within the human body without actually inserting any measuring apparatus into the body tissues.

The foregoing disclosure and drawings are merely illustrative of the principles of this invention and are not to be interpreted in a limiting sense. The only limitations are to be determined from the scope of the appended claims.

I claim:

1. A dosimetry system for applying penetrating radiation to the human body comprising, a right-angled frame for viewing X-ray pictures taken of the body at right angles to each other and with intersecting median rays, a support mounted adjacent to said frame, a source of penetrating radiation which is to be applied to a predetermined position in the body, a plurality of radiation sensitive devices for measuring the radiation produced by said source, clamping means for securing the source and the radiation sensitive devices to the support in the relative positions of the source and selected body organs when the source is in the body; and measuring means for determining the dosage received by the body organs; said measuring means including a container for holding the support and its clamps immersed in water, and radiation indicating means for connection to said radiation sensitive devices.

2. A dosimetry system as claimed in claim 1 wherein said source of penetrating radiation is a radioactive material which radiates gamma rays.

3. A dosimetry system as claimed in claim 1 wherein said radiation sensitive devices are scintillation counters having a scintillation crystal in combination with a photosensitive transducer coupled to an indicating current meter.

4. A dosimetry system as claimed in claim 1 wherein said radiation sensitive devices are ion chambers having a capacitor which may be charged to an initial potential, and which loses its potential responsive to the amount of penetrating radiation received.

5. A dosimetry system as claimed in claim 1 wherein a plurality of radiation sources are used in the human body and are disposed on the support in their relative positions.

6. The method of determining the dosage received by selected organs of the body when a source of penetrating radiation is inserted into one of the body cavities, said method comprising the following steps: taking two X-ray pictures of the body region to be treated, said pictures taken when disposed at right angles to each other and with the median rays intersecting; mounting said pictures in a frame which disposes them at right angles to each other; positioning a source of penetrating radiation on a base adjacent to said pictures, positioning a plurality of radiation sensitive devices adjacent to the source and in a relative position which would be occupied by the selected vital objects when the body is irradiated, and then connecting the radiation sensitive devices to an indicating means while the source and said devices are immersed in water.

7. The method as claimed in claim 6 wherein said source of penetrating radiation and said radiation sensitive devices are positioned relative to each other by noting the positions of the selected vital objects in said pictures with allowances being made for the divergent nature of the X-rays when the pictures were taken.

8. The method as claimed in claim 6 wherein two scales are employed to position said vital objects, said scales having scale divisions proportional to the divergent paths of the penetrating rays when said two X-ray pictures were taken.

References Cited by the Examiner

UNITED STATES PATENTS 1,442,027  1/1923  Levenson _____ 250—50

RICHARD A. GAUDET, *Primary Examiner.*

SIMON BRODER, *Examiner.*